United States Patent

[11] 3,549,191

[72] Inventors Francis A. Sarkozy;
 Wasyl Bystrianyk, West Hartford, Conn.
[21] Appl. No. 773,026
[22] Filed Nov. 4, 1968
[45] Patented Dec. 22, 1970
[73] Assignee Emhart Corporation
 Bloomfield, Conn.
 a corporation of Connecticut

[54] TAKE-OUT MECHANISM FOR GLASSWARE FORMING MACHINE
 5 Claims, 4 Drawing Figs.
[52] U.S. Cl..................................................... 294/81,
 65/260; 214/1; 294/87.24, 294/119
[51] Int. Cl..................................................... C03b 9/44
[50] Field of Search.......................................... 294/87, 24,
 81, 118, 119; 65/260; 214/(Inquired), 1B

[56] References Cited
UNITED STATES PATENTS
3,125,369 3/1964 Copping...................... 294/87.24
3,220,566 11/1965 Rowe............................ 65/260X Primary Examiner—S. Leon Bashore
Assistant Examiner—Robert L. Lindsay, Jr.
Attorney—McCormick, Paulding and Huber ABSTRACT: A cylindrical housing is mounted in depending relationship on an oscillating arm, and carries two sets of tongs at its lower end for transferring newly formed glassware from the interior of a glassware forming machine onto a deadplate. The housing includes a fluid actuator for reciprocating a cross bar vertically to open and close the tongs. Linkage, including a pair of toggle links connect these tongs to the ends of the cross bar for achieving opening and closing movement of the tongs, which tongs are mounted on a common rockshaft supported adjacent the lowermost end of the housing.

PATENTED DEC 22 1970
3,549,191
FIG. 2
FIG. 1
FIG. 3
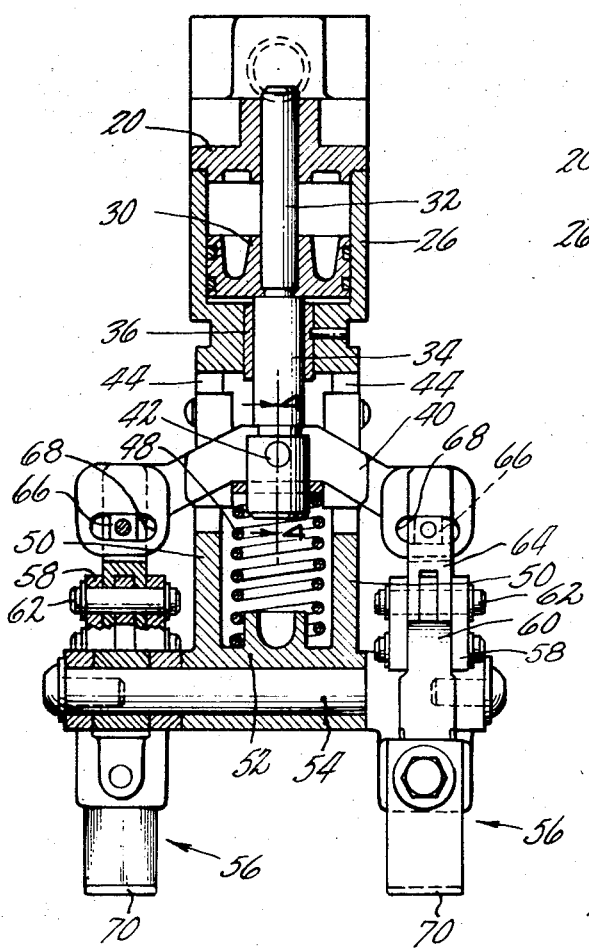
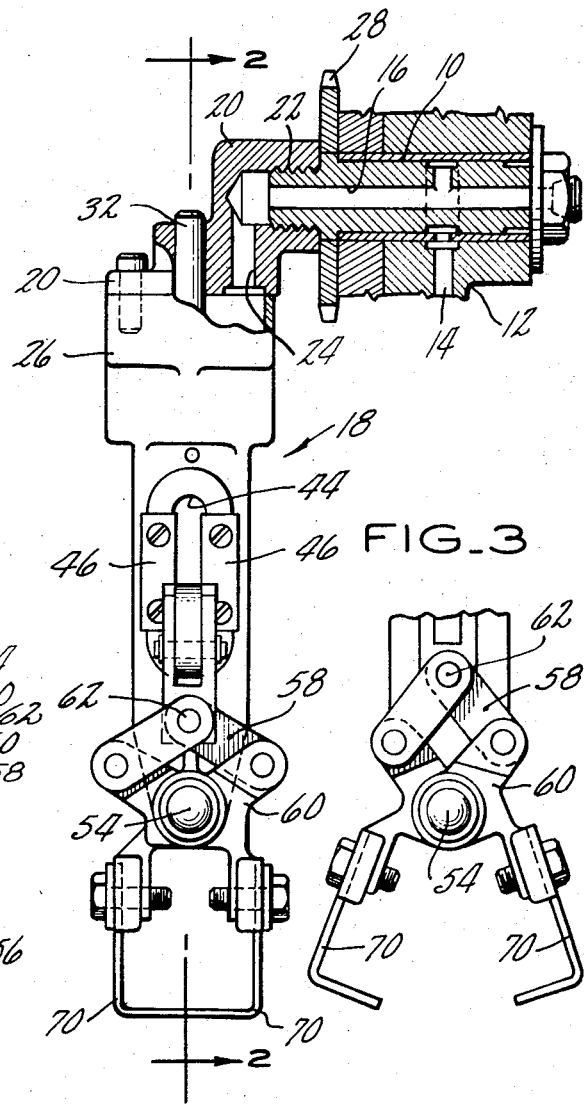
FIG. 4
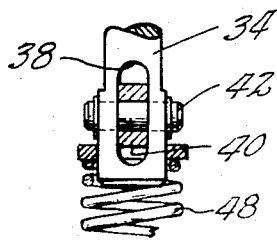
INVENTORS
FRANCIS A. SARKOZY
WASYL BYSTRIANYK
BY McCormick, Paulding & Huber
ATTORNEYS 3,549,191

TAKE-OUT MECHANISM FOR GLASSWARE FORMING MACHINE

SUMMARY OF THE INVENTION

This invention relates to devices for transferring glassware articles from the final molding station of the glassware forming machine to a cooling station, or other delivery point, and deals more particularly with a takeout mechanism of improved design for efficiently handling groups of newly formed ware at high production rates.

The general object of the present invention is to provide a takeout mechanism wherein the tongs for gripping the ware are provided on a common axis and are operated through a novel lightweight linkage having no springs exposed to the heat radiated by the rapidly cooling ware during transfer from the molding station to the cooling station, or other delivery point.

BRIEF DESCRIPTION OF THE DRAWINGS

FIG. 1 is an elevation view of a glassware take-out mechanism constructed in accordance with the present invention, also showing the oscillatable mounting arm and associated support shaft upon which mechanism is mounted, the latter portions being shown broken away to reveal the valving for regulating a fluid actuator contained in the housing for said mechanism.

FIG. 2 is a vertical sectional view of the mechanism shown in FIG. 1, being taken on line 2–2 of that figure.

FIG. 3 is a partial view of the lower portion of the mechanism shown in FIG. 1 with the tongs being shown in their open position.

FIG. 4 is a sectional view taken on line 4–4 of FIG. 2.

DETAILED DESCRIPTION

The takeout mechanism to be described is intended for use in a glassware forming machine of the Hartford I. S. type wherein a plurality of sections are adapted to form one or more glassware articles per section as generally described in U.S. Pat. No. 1,911,119 issued to Ingle May 23, 1933. The various components of such a machine are air operated in timed relationship with one another, and while such a machine need not be described in detail herein, it is noted that the oscillating arm 12 and its associated shaft 10, shown in FIG. 1, are driven in timed relationship with other components of the glassware forming machine, as for example, the mechanism for opening the blow mold at the final forming station of such a machine.

The movable arm 12 is pivotally mounted in the fixed frame of the machine and includes suitable ports 14 for providing air under pressure to a bore 16 in the shaft 10 for operation of a fluid actuator to be described. The takeout mechanism has a housing 18, indicated generally at 18, which is threadably mounted to one end portion of the shaft 10 by a cap 20 which cap defines the upper portion of the housing 18. The cap 20 defines an internal passageway, as shown at 24, in order to provide air under pressure to a fluid actuator provided in an upper portion 26 of the takeout mechanism housing 18. The arm 12 is adapted to oscillate through a predetermined angular displacement, and the shaft 10 is held against rotation by a sprocket 28 so that the housing 18 of the takeout mechanism remains in a depending position during pivotal movement of the arm 12.

The housing 18 of the takeout mechanism is of elongated cylindrical shape, having an upper portion 26 which defines a cylinder, best shown in FIG. 2, for slidably receiving an air operated piston 30. The piston 30 has a piston rod 32 extending upwardly therefrom into a bore in the cap 20 so as to guide the piston 30 during its reciprocatory movement. A plunger 34 extends downwardly from the piston 30 being slidably received in a bushing 36 provided for this purpose in an intermediate portion of the housing 18. The lower end portion of the plunger 34 is slotted as best shown at 38 in FIG. 4 to receive a cross bar 40 which is pivotally mounted to the plunger on an axle or pin 42. The cross bar 40 includes outwardly extending arm portions which are slidably received in slots 44, 44 defined in the housing 18. These slots 44, 44 are provided with hardened steel or guide plates 46, 46 to guide the cross bar during vertical movement thereof in response to reciprocating movement of the plunger 34.

A compression spring 48 acts between the lower end portion of the housing 18 and a retaining washer adjacent the underside of the cross bar, at the plunger connection point, to urge these parts upwardly when air under pressure is not supplied to the upper side of the piston 30. As so located the compression spring 48 is effectively isolated from radiant heat given off by the ware being transferred.

The generally cylindrical lower sidewall 50 of the housing 18 and the lowermost end portion 52 thereof are arranged between said spring and said glassware to provide a sheltered environment for the single return spring 48.

A rockshaft 54 is pivotally mounted in the lower end portion of the housing 18, and is oriented in generally parallel relationship to the cross bar 40, with its opposite end portions protruding outwardly beyond the sidewall 50 of the housing in downwardly spaced relationship to the ends of the cross bar 40. A pair of ware engageable tong means 56, 56 are pivotably mounted on the protruding rockshaft end portions for movement between the positions shown in FIGS. 1 and 3. Toggle link means 58, 58 cooperate with crank arms 60, 60 of each of the tong means 56 to provide opening and closing movement of the latter in response to vertical reciprocatory movement of the knee portions 62, 62 of the toggle in a conventional manner. A connecting link 64 is provided between each of the end portions of the cross bar 40 and each of the knee portions 62 of the toggle for operation of the tongs as described above in response to vertical movement of the cross bar and plunger. An upper portion of each connecting link 64 carries a generally square pin 66 which is slidably received in a laterally extending slot 68 in the end portion of the cross bar 40 to allow limited lateral movement of the cross bar with respect to the connecting link 64 so that the tong means 56 can accommodate pairs of glassware articles of slightly different height, or so that one tong means can be used to pick up a single article of glassware.

The tong means 56, 56 and associated toggle 58, 58 may be of conventional construction, in that downward movement of the knee portions 62, 62 of the toggle causes closing movement of the jaws 70, 70 to grip the articles of glassware so that they can be raised from the molding station of a glassware forming machine by pivotal movement of the arm 12 and for transfer to a deadplate, or other delivery station alongside the machine. The glassware article is released by upward movement of the knee portions 62, 62 in response to return movement of the spring 48. In the event that the portion of the two articles of glassware to be gripped by the jaws are of slightly different diameters or cross sectional dimensions, the jaws of one tong means may close into engagement with its article in advance of the closing of the jaws of the other tongs. In such a case, the cross bar 40 may tilt in the manner described above as a result of the lateral slots 68, 68 provided for this purpose. Thus, the second tong, and its associated jaws may also be closed prior to transfer of the glassware articles.

We claim:

1. A takeout mechanism for a glassware forming machine having oscillatory means driven in timed relationship with other glassware forming machine components, said takeout mechanism comprising a fluid actuator having a housing adapted for attachment to said means, a vertically reciprocable plunger movably mounted in said housing, a cross bar pivotally mounted to a lower end portion of said plunger and slidably mounted in said housing, a compression spring acting between a lower end portion of said housing and said plunger to urge the latter upwardly, a rockshaft pivotally mounted in the lower end portion of said housing in generally parallel relationship to said cross bar and having end portions protruding outwardly beyond said housing, a pair of ware engageable tong means pivotally mounted on said protruding rock shaft end portions, and toggle link means for connecting said tong means to the ends of said cross bar for operation of said tong means in response to vertical movement of said cross bar.

2. The combination defined in claim 1 wherein said housing has an upper portion which defines an air cylinder, a sleeve bearing mounted in an intermediate portion of the housing for slidably supporting said plunger, and a lower portion of said housing which is generally cylindrical, said lower cylindrical portion of said housing having an upper port with diametrically opposed side openings for slidably receiving said cross bar, and said lower cylindrical portion providing a protective enclosure for said compression spring and having a diametrically extending bore in its lowermost end for rotatably receiving said rockshaft.

3. The combination defined in claim 2 wherein said fluid actuator includes a piston slidably received in said upper cylinder defining portion of said housing, said plunger being connected to said piston for movement therewith, hardened steel guide plates in said housing side openings for guiding said cross bar, and wherein said cross bar extends through a slot in said plunger, a pivot pin extending through an opening in said plunger and through an aligned opening in said cross bar, and a spring retaining washer mounted on the lower end of said plunger engaging the underside of said cross bar.

4. The combination defined in claim 3 wherein each of said toggle link means includes a knee portion movable toward and away from its associated rockshaft end portion, and connecting links for connecting the ends of said cross bar to said toggle link knee portions respectively.

5. The combination defined in claim 4 wherein said cross bar ends define laterally extending slots, and wherein said connecting links are pivotally connected at their lower ends to said toggle link knee portions respectively, and pivot pin means at the upper ends of said connecting links for both pivotally connecting said links to said cross bar ends and for permitting limited lateral movement thereof to accommodate pairs of glassware articles of varying size.